US012602246B2

(12) United States Patent
Poddar et al.

(10) Patent No.: US 12,602,246 B2
(45) Date of Patent: Apr. 14, 2026

(54) MANAGEMENT AND ORCHESTRATION OF MICROSERVICES

(71) Applicant: NetApp Inc., San Jose, CA (US)

(72) Inventors: Jayanta Poddar, Bangalore (IN); Prodosh Kumar Mohanty, Bangalore (IN); Nikhil Bhavadas Kaplingat, Karnataka (IN); Dhivya Mohanasundaram, Nagapattinam (IN); Venkat Thangella, Nalgonda (IN); Vineeth Kumar Chalil Karinta, Apex, NC (US)

( * ) Notice: Subject to any disclaimer, the term of this patent is extended or adjusted under 35 U.S.C. 154(b) by 81 days.

(21) Appl. No.: 18/456,691

(22) Filed: Aug. 28, 2023

(65) Prior Publication Data
US 2023/0401088 A1 Dec. 14, 2023

Related U.S. Application Data

(62) Division of application No. 17/243,650, filed on Apr. 29, 2021, now Pat. No. 12,169,736.

(51) Int. Cl.
*H04L 9/40* (2022.01)
*G06F 8/60* (2018.01)
(Continued)

(52) U.S. Cl.
CPC .............. *G06F 9/4843* (2013.01); *G06F 8/60* (2013.01); *G06F 8/63* (2013.01); *G06F 8/65* (2013.01);
(Continued)

(58) Field of Classification Search
CPC . G06F 9/4843; G06F 8/60; G06F 8/63; G06F 8/65; G06F 8/71; G06F 9/4881;
(Continued)

(56) References Cited

U.S. PATENT DOCUMENTS 7,853,643 B1 12/2010 Martinez et al.
8,375,144 B2 2/2013 Bunch et al.
(Continued)

FOREIGN PATENT DOCUMENTS

CN 112181587 A * 1/2021 ............... G06F 8/60
CN 112181587 B * 9/2022 ......... G06F 9/45558

OTHER PUBLICATIONS

Final Office Action mailed May 3, 2024 for U.S. Appl. No. 17/243,650, filed Apr. 29, 2021, 16 pages.
(Continued)

*Primary Examiner* — David R Lazaro
*Assistant Examiner* — Berhanu Shitayewoldetadik

(57) ABSTRACT
Techniques are provided for microservices management and orchestration. A chart package is selectively retrieved from a chart repository based upon the chart package corresponding to a set of services to host within a cluster and dependencies amongst the set of services. A set of container images may be retrieved from a container repository based upon the set of container images corresponding to the set of services. A cluster may be created within a computing environment. The set of services may be deployed as resources of the computing environment within the cluster and the dependencies may be configured using the chart package and the set of container images.

20 Claims, 9 Drawing Sheets

(51) Int. Cl.

| | |
|---|---|
| *G06F 8/61* | (2018.01) |
| *G06F 8/65* | (2018.01) |
| *G06F 8/71* | (2018.01) |
| *G06F 9/48* | (2006.01) |
| *G06F 9/50* | (2006.01) |
| *G06F 9/54* | (2006.01) |
| *G06F 11/1446* | (2026.01) |
| *G06F 15/16* | (2006.01) |
| *H04L 12/66* | (2006.01) |
| *H04L 15/16* | (2006.01) |

(52) U.S. Cl.
CPC .............. *G06F 8/71* (2013.01); *G06F 9/4881* (2013.01); *G06F 9/5005* (2013.01); *G06F 9/546* (2013.01); *G06F 11/1469* (2013.01); *H04L 63/0272* (2013.01); *H04L 63/20* (2013.01); *G06F 2201/82* (2013.01); *G06F 2209/501* (2013.01)

(58) Field of Classification Search
CPC .... G06F 9/5005; G06F 9/546; G06F 11/1469; G06F 2201/82; G06F 2209/501; G06F 2201/815; G06F 2201/84; G06F 9/455; G06F 9/5072; G06F 11/1433; G06F 11/1453; G06F 11/2094; G06F 11/2097; G06F 21/53; H04L 63/0272; H04L 63/20
USPC ............................................ 79/222; 709/222
See application file for complete search history.

(56) References Cited

U.S. PATENT DOCUMENTS

| | | | |
|---|---|---|---|
| 8,635,326 B1 | 1/2014 | Chaganti et al. | |
| 8,959,503 B2 | 2/2015 | Teh et al. | |
| 9,785,426 B2 | 10/2017 | Madanapalli et al. | |
| 10,218,705 B2 | 2/2019 | Wilson et al. | |
| 10,255,413 B2 | 4/2019 | Gaur et al. | |
| 10,261,782 B2 | 4/2019 | Suarez et al. | |
| 10,445,395 B2 | 10/2019 | Carru et al. | |
| 10,516,672 B2 | 12/2019 | Gupta et al. | |
| 10,725,775 B2 | 7/2020 | Suarez et al. | |
| 10,735,394 B2 | 8/2020 | Gupta et al. | |
| 11,171,845 B2 | 11/2021 | Papacica et al. | |
| 11,356,394 B2 | 6/2022 | Edamadaka et al. | |
| 11,496,607 B2 | 11/2022 | Garaga et al. | |
| 11,635,995 B2 | 4/2023 | Bahl et al. | |
| 12,169,736 B2 | 12/2024 | Poddar et al. | |
| 2005/0226059 A1* | 10/2005 | Kavuri | G06F 3/0605 |
| | | | 365/189.05 |
| 2007/0094294 A1* | 4/2007 | Ellsworth | G06F 16/256 |
| | | | 707/999.102 |
| 2007/0103984 A1* | 5/2007 | Kavuri | G06F 16/122 |
| | | | 365/185.17 |
| 2012/0131568 A1 | 5/2012 | Sohn | |
| 2014/0059311 A1 | 2/2014 | Oberhofer et al. | |
| 2014/0101648 A1 | 4/2014 | Teh et al. | |
| 2015/0331753 A1* | 11/2015 | Nakajima | G06F 11/2071 |
| | | | 714/15 |
| 2017/0054590 A1* | 2/2017 | Agarwal | H04L 67/146 |
| 2017/0060561 A1 | 3/2017 | Miller et al. | |
| 2017/0060570 A1 | 3/2017 | Miller et al. | |
| 2017/0177860 A1 | 6/2017 | Suarez et al. | |
| 2017/0177877 A1* | 6/2017 | Suarez | G06F 21/6218 |
| 2017/0207970 A1* | 7/2017 | Macatangay | H04L 41/0866 |
| 2018/0157480 A1 | 6/2018 | Ivanov et al. | |
| 2018/0196741 A1 | 7/2018 | Qureshi et al. | |
| 2019/0297072 A1 | 9/2019 | Kulkarni et al. | |
| 2019/0354354 A1* | 11/2019 | Dubinskii | G06F 11/3466 |
| 2020/0092235 A1 | 3/2020 | Van Der Sanden | |
| 2020/0117478 A1* | 4/2020 | Li | G06F 9/455 |
| 2021/0200814 A1 | 7/2021 | Tal et al. | |
| 2021/0216347 A1 | 7/2021 | Seshadri et al. | |
| 2021/0224165 A1* | 7/2021 | Jablonski | G06F 9/5027 |
| 2022/0012045 A1 | 1/2022 | Rudraraju et al. | |
| 2022/0114173 A1 | 4/2022 | Glass et al. | |
| 2022/0350642 A1 | 11/2022 | Poddar et al. | |
| 2023/0012869 A1 | 1/2023 | Suarez et al. | |
| 2023/0409381 A1 | 12/2023 | Poddar et al. | |
| 2024/0305688 A1* | 9/2024 | Raju A | H04L 67/1095 |
| 2025/0117246 A1 | 4/2025 | Poddar et al. | |

OTHER PUBLICATIONS

Notice of Allowance mailed Aug. 15, 2024 for U.S. Appl. No. 17/243,650, filed Apr. 29, 2021, 08 pages.
Non-Final Office Action mailed on Nov. 13, 2023 for U.S. Appl. No. 17/243,650, filed Apr. 29, 2021, 12 pages.
Notice of Allowance mailed Feb. 5, 2026 for U.S. Appl. No. 18/456,702, filed Aug. 28, 2023, 20 pages.

* cited by examiner

400

402
RETRIEVE CHART PACKAGE SELECTED FROM CHART REPOSITORY

404
RETRIEVE SET OF CONTAINER IMAGES FROM CONTAINER REPOSITORY

406
CREATE CLUSTER WITHIN COMPUTING ENVIRONMENT

408
DEPLOY SET OF SERVICES AND CONFIGURE DEPENDENCIES USING CHART PACKAGE AND SET OF CONTAINER IMAGES

500

DEPLOY SERVICE AGENT WITHIN CONTAINER — 502

DETERMINE WHETHER NEW
SERVICE AGENT CONTAINER
IMAGE IS AVAILABLE — 504

NO

CONTINUE PROCESSING
REQUESTS THROUGH
SERVICE AGENT — 510

YES

UPDATE CONTAINER MANAGEMENT COMPONENT TO POINT TO NEW
SERVICE AGENT CONTAINER IMAGE — 506

UPGRADE SERVICE AGENT BASED UPON NEW SERVICE AGENT
CONTAINER IMAGE — 508

700

702

RECEIVE JOB REQUEST MESSAGE

704

INVOKE WORKFLOW ENGINE TO CREATE INSTANCE OF WORKFLOW

706

IMPLEMENT WORKFLOW TO INSERT FIRST TASK MESSAGE INTO TASK REQUEST EXCHANGE

708

ROUTE FIRST TASK MESSAGE TO SERVICE TO EXECUTE

710

UPDATE STATUS OF JOB

MANAGEMENT AND ORCHESTRATION OF MICROSERVICES

RELATED APPLICATIONS

This application claims priority to and is a divisional of U.S. application Ser. No. 17/243,650, filed on Apr. 29, 2021, titled "MANAGEMENT AND ORCHESTRATION OF MICROSERVICES," which is incorporated herein by reference.

BACKGROUND

A computing environment may provide storage services for client devices. For example, a client device may connect to a node of the computing environment in order to store and/or access data stored by the node within storage managed by the node. The node may provide the client device with various storage services, such as backup functionality, restore functionality, deduplication functionality, compression functionality, snapshot functionality, etc. Such storage services provide improved data protection and storage efficiency for the client device.

DETAILED DESCRIPTION

Figure 1:
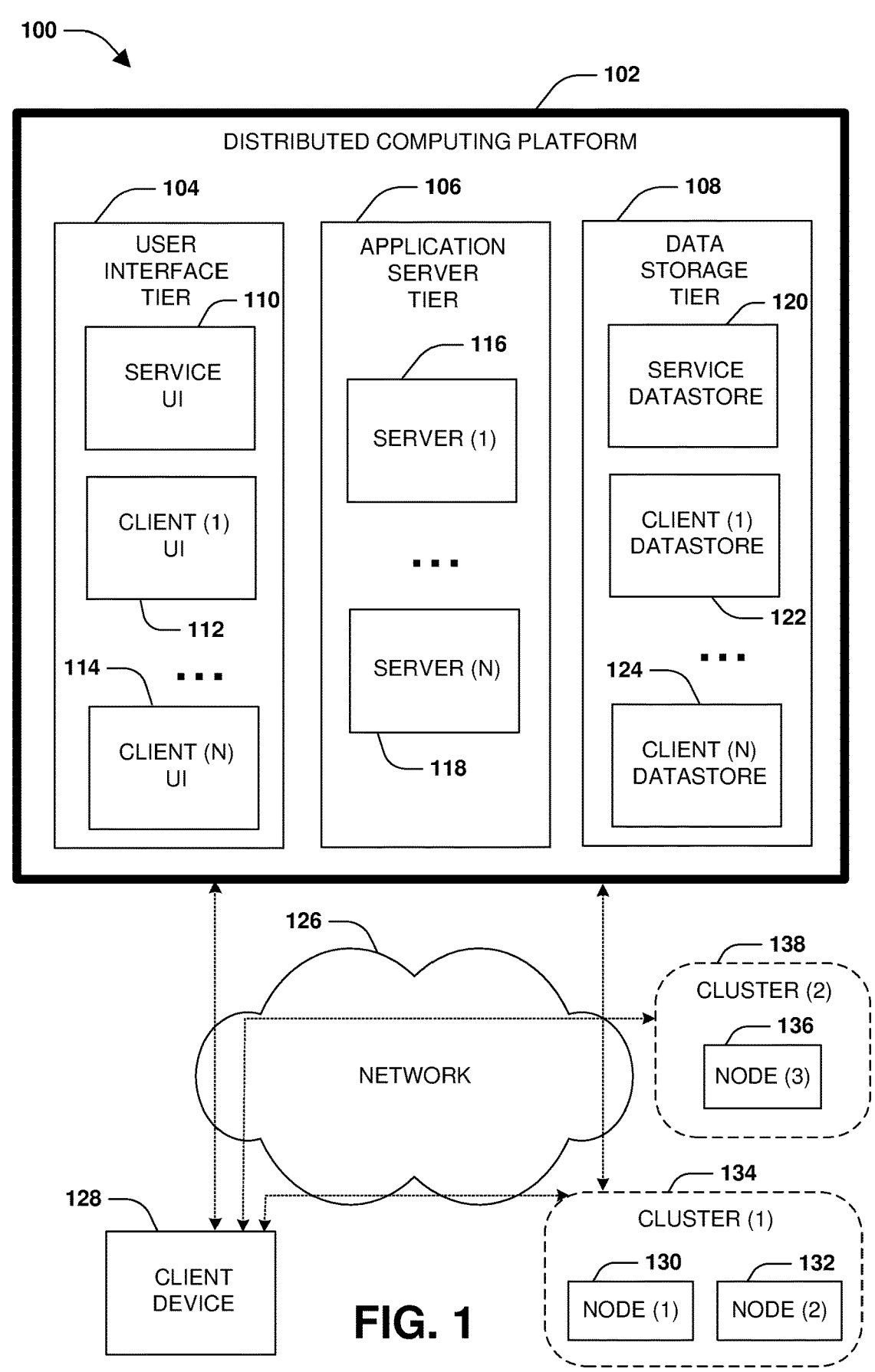
FIG. 1 is a block diagram illustrating an example of a computing environment in which an embodiment of the invention may be implemented.

The techniques described herein are directed to microservices management and orchestration. A node (e.g., a server, a virtual machine, a computing device, hardware, software, or combination thereof) may provide clients with on-premise file systems, application hosting, virtual machines, storage, and/or storage services. Examples of storage services provided by some nodes include, but are not limited to, backup functionality, restore functionality, application consistency snapshots, and the like. In this way, the node is capable of providing the clients with data protection and storage efficiency functionality. Many clients are transitioning from maintaining data on-premise (e.g., storing data within local storage) to storing data through remote data storage providers, such as within cloud computing environments hosted by cloud providers or other types of remote object stores. Unfortunately, remote data storage providers may not provide adequate data protection and storage efficiency functionality that clients may otherwise receive through the node.

Separately implementing the data protection and storage efficiency functionality of the node through a cloud computing environment beyond what storage functionality is natively provided by the cloud computing environment is difficult and impractical. For example, a client storing data within the cloud computing environment cannot just create an application consistent snapshot of the data, for backup and restore purposes. Instead, the client must manually create scripts and/or manually implement tools that are customized for quiescing an application that consumes the data within the cloud computing environment. Quiescing the application will stop the application from making changes to the data stored within the cloud storage environment. Once quiesced, the application consistent snapshot of the data stored within the cloud storage environment can be created because the data is no longer being actively modified by the application. After the application consistent snapshot is created, the manually created scripts and/or tools are used to unquiesce the application so that the application can resume operation. Thus, creating application consistent snapshots, along with implementing other data protection and storage efficiency, for data stored within the cloud computing environment is complex, difficult, and requires extensive manual efforts to create customized scripts and tools for each individual application and situation.

Accordingly, as provided herein, an architecture is implemented to deploy, manage, and orchestrate microservices that provide data protection, storage efficiency, and/or other services. This architecture can deploy, manage, and orchestrate the microservices within and/or across various computing environments, such as within cloud computing environments of various cloud providers, on-premise utilizing local hardware and/or software of a client, and/or across both cloud computing environments and on-premise. This architecture is configured to create clusters within a computing environment, deploy services within the clusters, upgrade the services and components of the architecture, manage the execution of jobs and tasks by the services, and/or perform other management and orchestration.

Figure 8:
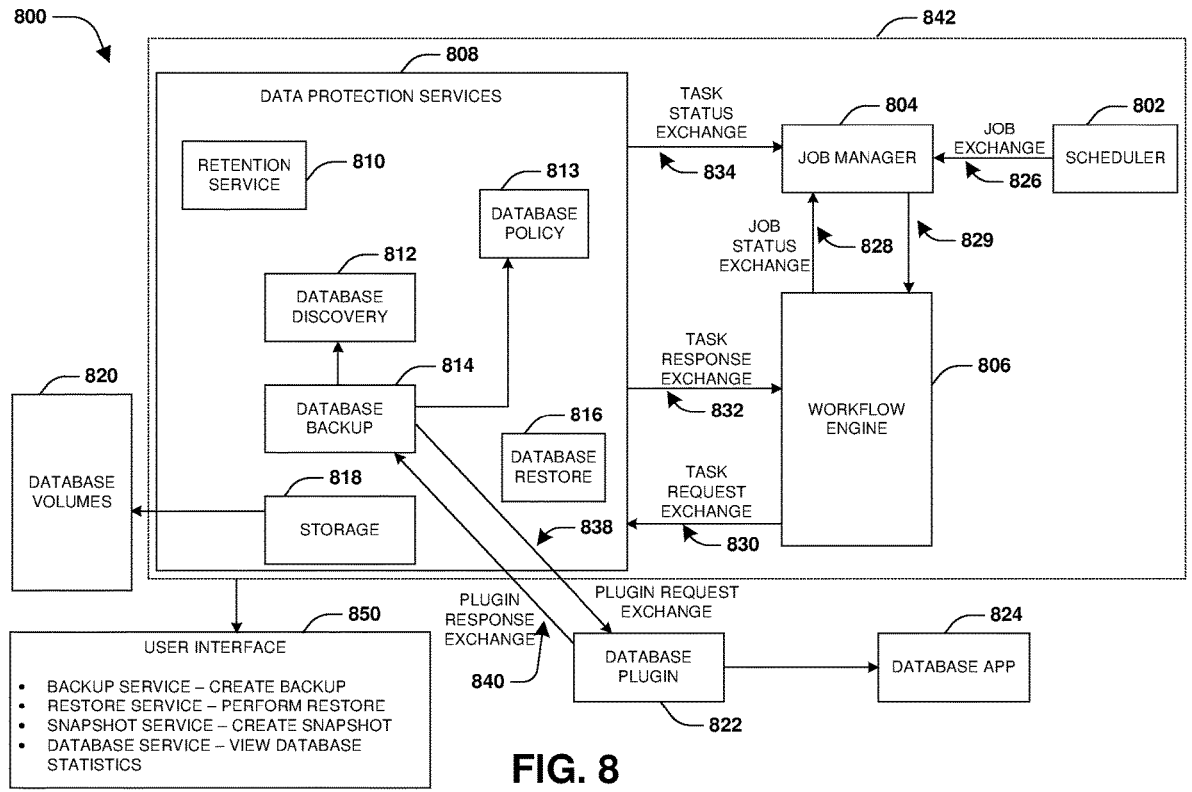
FIG. 8 is a block diagram illustrating an example of supporting microservices management and orchestration in accordance with an embodiment of the invention.

This architecture implements a client facing user interface, such as user interface 850 of FIG. 8, through which clients can interact with services, and a service agent used to create clusters within a computing environment, deploy the services into the clusters, and facilitate communication between client devices and the services. In some embodiments, the user interface is implemented as a single page app (SPA) that may be deployed through a bucket of the computing environment, and is served through a content delivery network service of the computing environment. The user interface may be hosted through a software as a service (SaaS) layer of the computing environment for access by any number of clients and client devices. In some embodiments, the user interface may be integrated using an iFrame into a cloud manager user interface that provides host management functionality, resource inventory functionality, policy creation and enforcement functionality, reporting functionality, backup functionality, restore functionality, clone functionality, and/or other functionality for the clients of the computing environment.

In some embodiments, the service agent, implemented by this architecture, is deployed as a container within a service connector hosted within a virtual machine inside a virtual private cloud of a client. Thus, each client will have their own service agent hosted within their own virtual private cloud in order to provide enhanced security for client data and clusters deployed by the service agent within the individual virtual private clouds of each client, as opposed to being hosted within a multi-tenant environment of multiple clients. The service agent is configured to create clusters, deploy services into the clusters using chart packages (e.g., a helm chart indicating dependencies amongst services) and container images (e.g., an image of a container of a service), route communication messages between the user interface and the services during operation of the clusters, etc.

In some embodiments, a cluster, implemented by this architecture, provides various services (microservices) for a client, such as data protection services, storage efficiency services, and/or other types of services that are made accessible through the user interface to a client device of the client. In some embodiments, the services of the cluster are deployed as resources within a container orchestration cluster (e.g., a Kubernetes cluster) using helm charts and container images. During operation of the cluster, this architecture provides a job manager, a workflow engine, and a scheduler that manage the processing of jobs by services through workflows. The scheduler is configured to schedule and run jobs, such as backup jobs, based upon policies configured by the client. The job manager is configured to initiate and track jobs, such as scheduled jobs from the scheduler or on-demand jobs received through the user interface and routed by the service agent to the job manager. The job manager invokes the workflow engine to create a workflow of tasks of the job for execution by the services of the cluster. In this way, the services can execute tasks of workflows managed by the workflow engine for jobs managed and tracked by the job manager. The services can execute jobs relating to backup workflows, restore workflows, discovery workflows, snapshot creation workflows (e.g., creation of an application consistent snapshot), application plugin functionality such as a plugin to access a database (e.g., a HANA database plugin), etc.

This architecture provides infrastructure services (e.g., job management, workflow management, and schedules), domain services that cater to application specific needs (e.g., data protection for various types of databases), storage services (e.g., support for various types of storage), SaaS integration services that integrate the services of the cluster with various SaaS platforms through which the user interface may be hosted, and on-premise integration.

In some embodiments, this architecture provides plugin support for cloud-native applications. For example, a plugin is designed to be deployed and operated within a cloud computing environment. The plugin may correspond to any of the components of the architecture such as the service agent and/or any of the services such as microservices deployed and managed by the architecture. This architecture, such as the service agent, uses APIs of a cloud provider of the cloud computing environment to deploy a cluster with specified compute, storage, and networking components on which the plugin (e.g., a service such as a microservice) is installed. For example, the service agent may utilize the APIs to deploy the cluster and install the plugin (e.g., a database plugin of a database service) in an automated manner without user intervention.

In some embodiments, this architecture deploys a plugin as a docker container on a Kubernetes cluster. The plugin (e.g., a service deployed by the service agent within a cluster created by the service agent within a computing environment) is deployed without using components specific to a particular cloud provider, and thus the plugin can be deployed in any cloud computing environment of any cloud provider or deployed on-premise. In some embodiments, open source components that can be utilized across various cloud computing environments and on-premise may be implemented for the plugin (the service), such as a MongoDB for persistence, a RabbitMQ for a message bus over which messages are transmitted between services of a cluster (e.g., messages between database services, infrastructure services, etc.), and/or a Netflix Conductor for a workflow engine that manages workflows comprising tasks, of jobs, that are executed by the services.

In some embodiments, this architecture utilizes the RabbitMQ message bus or other message bus (e.g., an exchange) whose queues (e.g., message queues of an exchange through which messages are passed between components and services) can be configured as durable. For example, these queues are persisted for durability such as within a persistent volume that is mounted to a RabbitMQ pod in a cluster such as a Kubernetes cluster. This provides fault tolerance against transient errors and resource recycling, which may be typical of cloud computing environments.

Various embodiments of the present technology provide for a wide range of technical effects, advantages, and/or improvements to computing systems and components. For example, various embodiments may include one or more of the following technical effects, advantages, and/or improvements: 1) use of non-conventional computer operations and techniques to provide data protection and storage efficiency for various computing environments (e.g., a cloud computing environment of a cloud provider and/or on-premise); 2) implementing various types of services (e.g., microservices) within a cloud computing environment for performing backup workflows, restore workflows, discovery workflows, snapshot workflows, database plugin functionality, and/or a wide variety of other workflows and services; 3) integration of job and workflow management for tasks being performed by the services through implementation of a job manager, workflow engine, and scheduler; 4) upgrading and versioning of a client facing user interface, a service agent, a cluster, and/or services; 5) implementation of a unique architecture for managing and orchestrating microservices through any cloud provider and/or for on-premise; 6) managing concurrency of job execution to ensure data consistency and ensure no data loss; 7) horizontal and vertical scaling up or down of additional services, plugins, and/or cluster resources based upon current demand; 8) implementing a architecture to provide functionality that is cloud provider agnostic; 9) implementing durable queuing of transmitting messages between services to handle unreliable cloud APIs; and 10) implementing plugins (e.g., services as plugins) for cloud-native applications hosted within a cloud computing environment.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other file system metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain file system operations needed to deduplicate a block, duplicate records in the dup file are sorted in certain file system sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
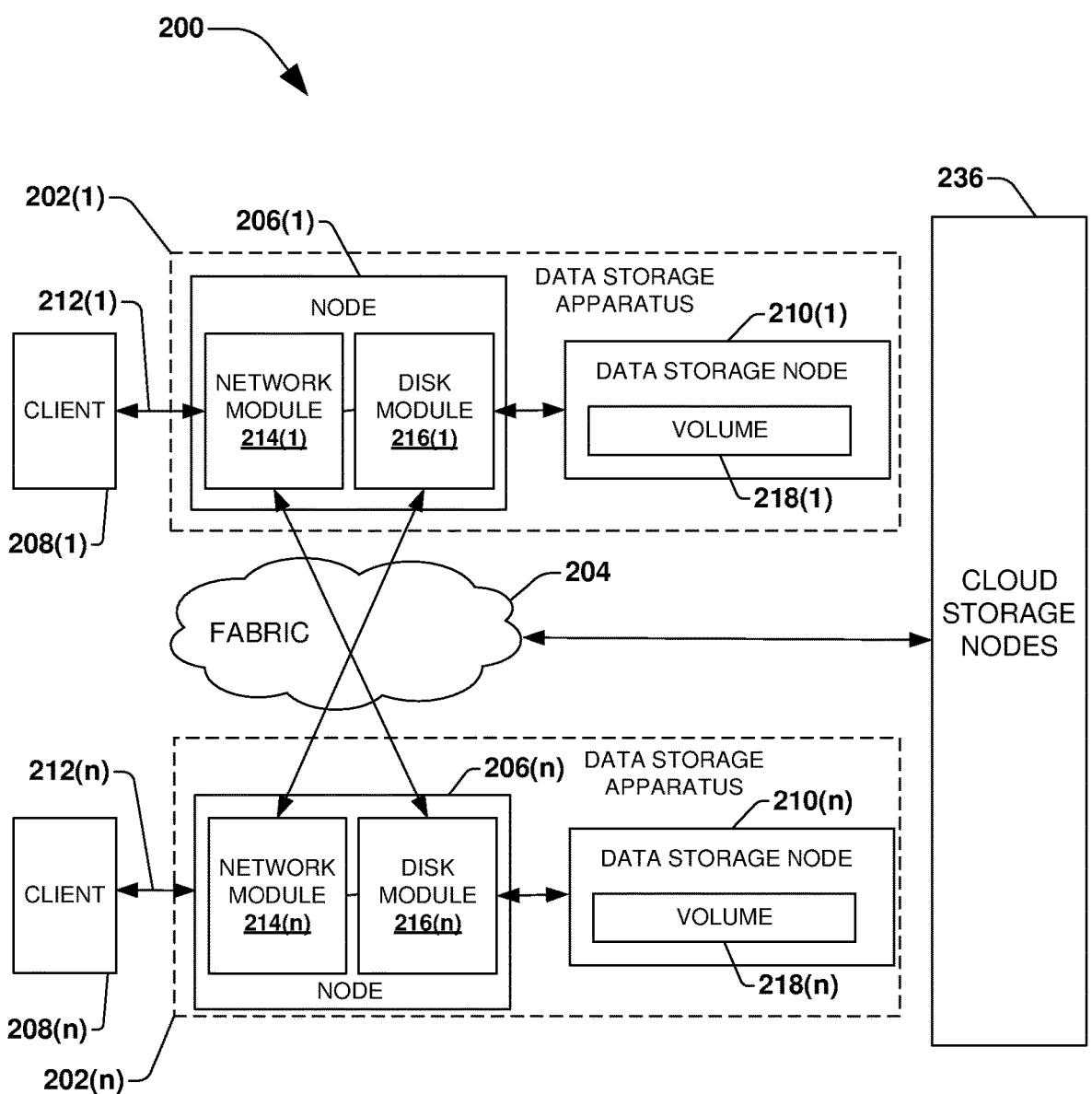
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210 (n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202 (1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more file systems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
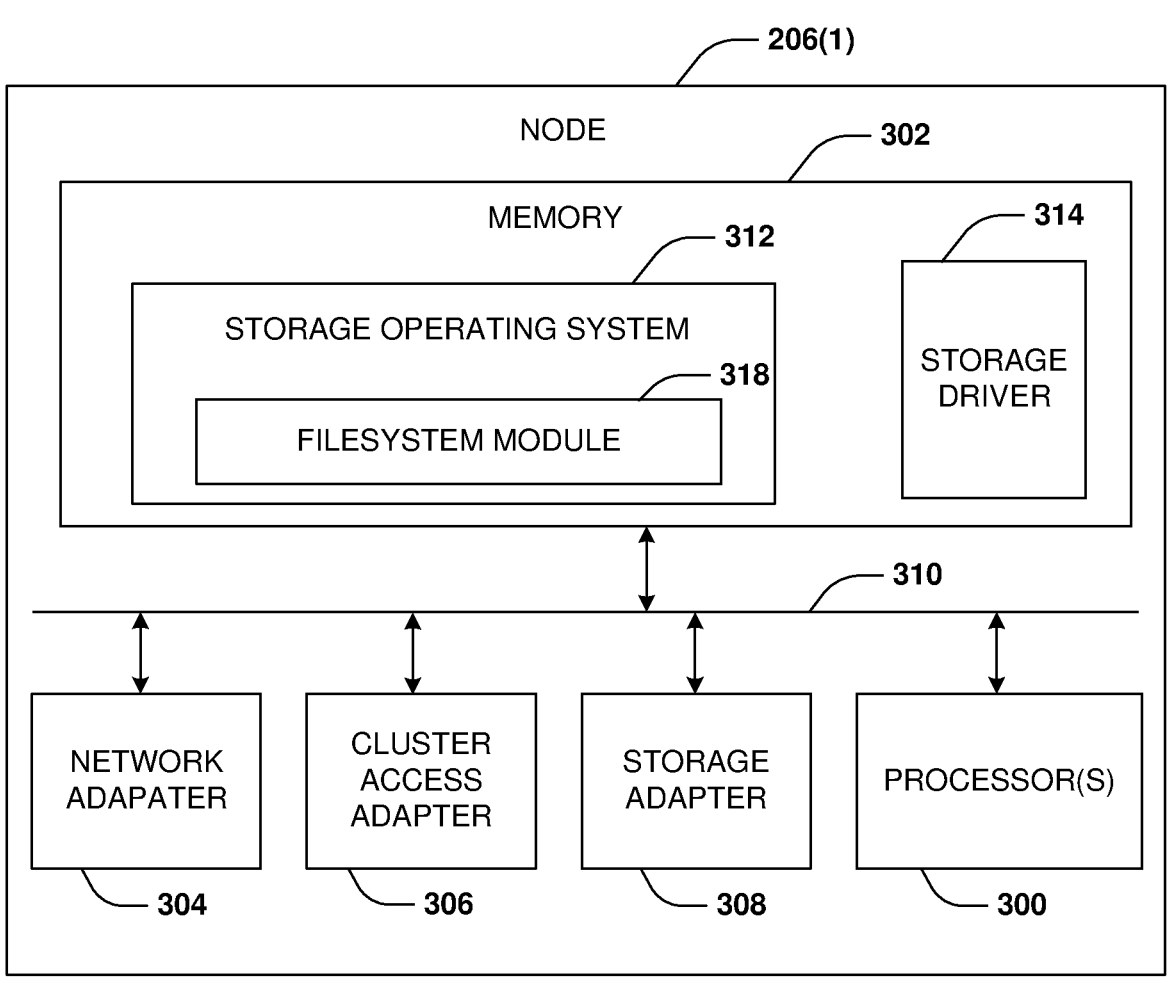
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g., a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more file systems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a file system.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
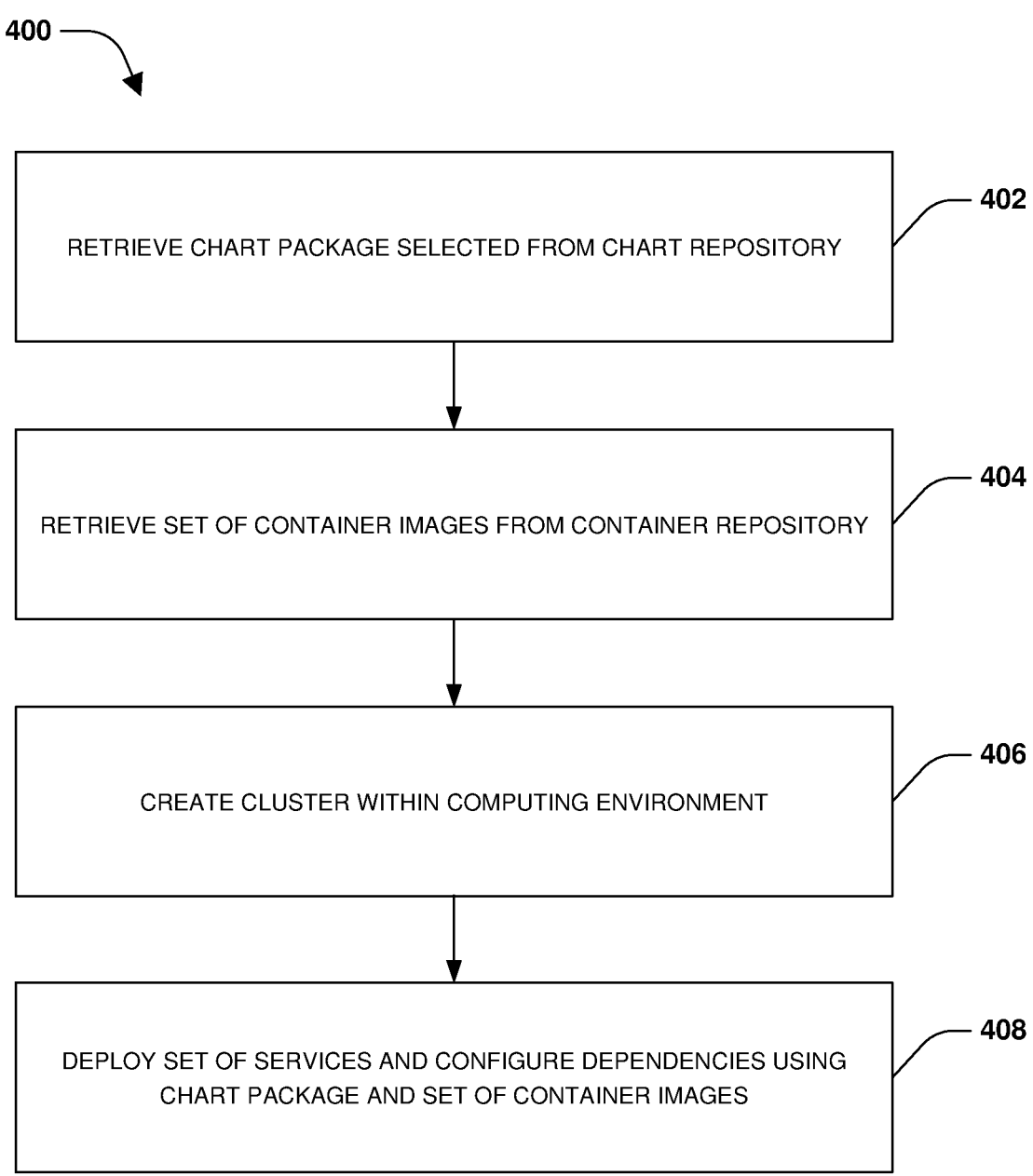
FIG. 4 is a flow chart illustrating an example of a set of operations that support microservices management and orchestration in accordance with an embodiment of the invention.
Figure 6:
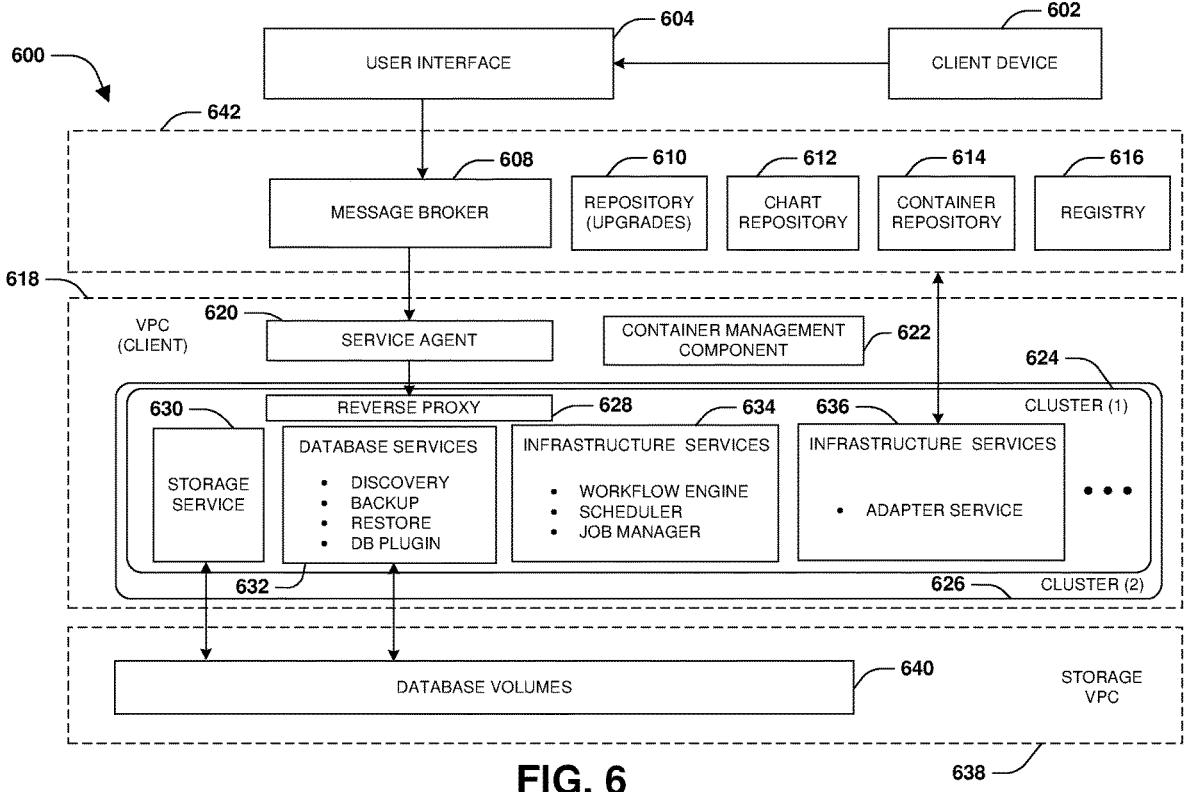
FIG. 6 is a block diagram illustrating an example of supporting microservices management and orchestration in accordance with an embodiment of the invention.

One embodiment of microservices management and orchestration is illustrated by an exemplary method 400 of FIG. 4 and further described in conjunction with system 600 of FIG. 6. The system 600 corresponds to an architecture for providing data protection, storage efficiency functionality, and/or other functionality to clients through services (e.g., plugins) hosted within a computing environment, such as a cloud computing environment or an on-premise computing environment. A service agent 620 may be configured to create one or more clusters, and deploy services such as microservices (e.g., a service as a plugin) into the one or more clusters in order to provide functionality to a client device 602 of a client. In some embodiments, the service agent 620 is hosted within a computing environment 618, such as a virtual private cloud that is deployed for the client associated with the client device 602 and is not shared with other clients. The service agent 620 may be deployed as a container within the computing environment 618. The computing environment 618 may be hosted by a cloud provider or may be hosted on-premise (e.g., hosted using local resources of the client).

A storage environment 638, such as a storage virtual private cloud deployed for the client, may be configured to store data on behalf of the client within one or more database volumes 640. In order to manage the data stored within the database volumes 640 within the storage environment 638, the client device 602 may access a user interface 604 that provides the client device 602 with access to various services that can be hosted within the computing environment

618 for managing the data. For example, the user interface may provide the client device 602 with access to reporting functionality, dashboard overview functionality, backup functionality, restore functionality, clone functionality, snapshot functionality, policy definition functionality, inventory functionality, host management functionality, etc.

In some embodiments, the user interface 604 may be deployed as a multi-tenant software as a service (SaaS) so that any client/tenant will see the same user interface 604. In some embodiments, the user interface 604 is implemented as a single page app (SPA) that may be deployed through a bucket of a computing environment, and is served through a content delivery network service of the computing environment. In some embodiments, the user interface 604 may be integrated using an iFrame into a cloud manager user interface that exposes host management functionality, resource inventory functionality, policy creation and enforcement functionality, reporting functionality, backup functionality, restore functionality, clone functionality, etc. to clients.

A message broker 608 may be configured to receive messages from the client device 602 through the user interface 604. In some embodiments, the message broker 608 may be configured to circumvent any communication restrictions by the computing environment 618 that would otherwise hinder communication between the client device 602 and the service agent 620. Accordingly, the message broker 608 may route messages from the client device 602 to the service agent 620.

In order to provide the client device 602 with data protection, storage efficiency, and/or other functionality, the service agent 620 may create clusters within the computing environment 618, and deploy the services such as microservices to the clusters (e.g., services deployed as plugins into the computing environment 618). The services may be deployed by the service agent 620 utilizing chart packages selected from a chart repository 612 and/or container images selected from a container repository 614. Accordingly, during operation 402 of method 400 of FIG. 4, the service agent 620 may retrieve a particular chart package from the chart repository 612 of chart packages. The service agent 620 may retrieve a particular chart package from the chart repository 612 of chart packages based upon the chart package corresponding to a set of services that are to be deployed to a cluster that the service agent 620 will created within the computing environment 618. The chart package may also describe dependencies amongst the set of services. In some embodiments, the chart package comprises a helm chart. In this way, the chart package comprises information that can be used by the service agent 620 to create resources such as Kubernetes resources within the cluster (e.g., deployed services, persistent volumes for storing data, etc. may be deployed as resources in the cluster). In some embodiments, the chart package may comprise a version number that was assigned to the chart package during a build procedure.

During operation 404 of method 400 of FIG. 4, the service agent 620 may retrieve a set of container images from a container repository 614 of container images. The service agent 620 may retrieve the set of container images from the container repository 614 of container images based upon the set of container images corresponding to images of containers of the set of services that are to be deployed within the cluster by the service agent 620. In this way, the service agent 620 acquires the chart package and the set of container images that can be used to deploy the set of services to the cluster.

During operation 406 of method 400 of FIG. 4, the service agent 620 creates the cluster within the computing environment 618. In some embodiments, the service agent 620 creates a first cluster 624 as the cluster within the computing environment 618. In some embodiments, the first cluster 624 comprises a Kubernetes cluster. In some embodiments, the first cluster 624 comprises a GKE cluster, which is created utilizing APIs of a cloud provider of the computing environment 618 within which the GKE cluster is created. It may be appreciated that the service agent 620 may create any type of cluster, and that the cluster may be cloud provider agnostic, and thus can be created in any cloud computing environment of any cloud provider and/or created on-premise.

During operation 408 of method 400 of FIG. 4, the set of services may be deployed as resources of the computing environment 618 within the first cluster 624 by the service agent 620, and the dependencies amongst the set of services are configured by the service agent 620. In some embodiments, the set of services are deployed as containers using the set of container images of the services. In some embodiments, the set of services are deployed as plugins to the computing environment 618. In some embodiments, the set of services may be deployed through the first cluster 624 as a single-tenant within a virtual private cloud of the client associated with the client device 602. Deploying the set of services as the single-tenant within the virtual private cloud of the client improves security for the client because the set of services and/or data of the client is not within a shared multi-tenant environment, and thus are not accessible by other clients. In some embodiments, the service agent 620 may route messages received from the message broker 608 (e.g., UI calls generated by the client device 602 interacting with the user interface 604) to destination services utilizing a reverse proxy 628. The reverse proxy 628 may be an ingress gateway to services, resources, and/or other components of the first cluster 624.

In some embodiments, the set of services comprises a storage service 630 that is deployed within the first cluster 624 by the service agent 620. The storage service 630 may provide access to data stored within the storage environment 638, such as data stored within database volumes 640. In some embodiments, the storage service 630 comprises a GCP storage service or any other type of storage service. In some embodiments, the set of services comprises database services 632 deployed within the first cluster 624 by the service agent 620. The database services 632 may comprise a discovery service. The discovery service may be configured to discovery databases or other resources associated with the client, such as database volumes 640 within the storage environment 638. The database services 632 may comprise data protection services. For example, the database services 632 may comprises a backup service. The backup service may be configured to create backups of data stored within the storage environment 638. For example, the backup service may be configured to create snapshots, application consistent snapshots (e.g., quiesce an application, create a snapshot, and then unquiesce the application), and/or other types of backups. Another type of data protection service of the database services 632 may comprise a restore service. The restore service may be configured to restore data within the storage environment 638 to a prior state. For example, a snapshot of a database volume of the database volumes 640 may be used by the restore service to restore the database volume back to a state captured by the snapshot. The database services 632 may comprise a database plugin. The database plugin may be configured to interact with database application hosts (e.g., a HANA database application host) that provide access to the database volumes 640. The database plugin may be cloud provider agnostics, and thus can be used to access any type of database, application host, or storage source.

In some embodiments, the set of services comprises a first set of infrastructure services 634 that is deployed within the first cluster 624 by the service agent 620. The first set of infrastructure services 634 may be configured to manage the processing of jobs, execution of tasks related to the jobs, and managing the workflow of task execution. The first set of infrastructure services 634 may comprise a job manager. The job manager may be configured to receive job request messages corresponding to jobs that are to be implemented by services within the first cluster 624, such as a discovery job that can be executed by the discovery service, a backup job that can be executed by the backup service, a restore job that can be executed by the restore service, etc. The first set of infrastructure services 634 may comprise a workflow engine. The workflow engine may comprise job definitions of jobs. A job definition of a job may define one or more tasks of the job that are to be executed by certain services within the first cluster 624. Accordingly, the job manager may invoke the workflow engine to create an instance of a workflow comprising one or more tasks of the job in response to the job manager receiving a job request message indicating that the job is to be performed. In an example, the job request message may be an on-demand request, such as from the client device 602. In another example, the job request message may be received from a scheduler of the first set of infrastructure services 634. The scheduler may implement a policy or schedule specifying when and how certain jobs are to be performed. In this way, the scheduler may transmit the job request message to the job manager based upon the policy or schedule indicating that the job is to be performed.

In some embodiments, the set of services comprises a second set of infrastructure services 636 that is deployed within the first cluster 624 by the service agent 620. The second set of infrastructure services 636 comprises an adapter service. The adapter service provides connectivity to a cloud manager environment 642, such as connectivity to a repository 610 of upgrades corresponding to versions of components of the architecture such as versions of the user interface, the chart repository 612 of chart packages, the container repository 614 of container images of versions of services, a registry 616 of service agent container images corresponding to versions of the service agent 620, etc.

During the creation of the first cluster 624 and/or deployment of the set of services to the first cluster 624, the service agent 620 may monitor for any failures. If the service agent 620 detects a failure associated with the creation of the first cluster 624 and/or the deployment of the set of services to the first cluster 624, then the service agent 620 an perform a rollback procedure to transition the computing environment 618 back to a state before the first cluster 624 was created and/or to a state before the set of services were deployed to the first cluster 624. Thus, the service agent 620 may retry the creation of the first cluster 624 and/or the deployment of the set of services to the first cluster 624.

In some embodiments, the service agent 620 may be configured to execute a cluster initialize procedure as part of creating the first cluster 624 and/or as part of deploying the set of services to the first cluster 624. The service agent 620 may execute the cluster initialization procedure to define a security policy. The security policy may be used to authenticate job request messages for executing jobs by the set of services, such as a job request message by the client device 602 that is received by the message broker 608 through the user interface 604 and is routed to the service agent 620 for transmission through the reverse proxy 628 to a destination service of the first cluster 624. The service agent 620 may execute the cluster initialization procedure to define a schedule. The schedule may be used by the scheduler of the first set of infrastructure services 634 to initiate the execution of scheduled jobs based upon the schedule. The service agent 620 may execute the cluster initialization procedure to define a data management policy associated with data backup and restore functionality implemented by one or more services within the first cluster 624, such as the backup service and restore service of the database services 632 within the first cluster 624. The service agent 620 may execute the cluster initialization procedure to define a startup job. The startup job may be used to initialize the set of services within the first cluster 624 in order to place the set of services in an operational state, such as where services are initialized to listen for particular messages, such as job requests messages, that are to be processed by the services.

In some embodiments, the service agent 620 may create one or more additional clusters, such as a second cluster 626 and/or any other number of clusters within the computing environment 618. The clusters created within the computing environment 618, such as the first cluster 624 and the second cluster 626, may be deploy for use by the client associated with the client device 602, but not by other clients. This is because the computing environment 618 may be a virtual private cloud exclusive to the client. Thus, other computing environments may be used to create clusters and/or deploy services for other clients associated with those other computing environments.

In some embodiments, the service agent 620 may create the second cluster 626 in order to deploy services that are different than the set of services deployed in the first cluster 624 in order to provide the client with other functionality provided by the services within the second cluster 626. In some embodiments, the service agent 620 may deploy the same set of services of the first cluster 624 to the second cluster 626 so that the second cluster 626 is a secondary cluster (a redundant cluster) that can take over the processing of jobs in place of the first cluster 624 in the event the first cluster 624 experiences a failure. The service agent 620 may deploy the redundant set of services to the second cluster 626 based upon a policy specifying that more than one set of services is to be maintained for failover purposes. In this way, if the first cluster 624 experiences the failure, then incoming job request messages are redirected from targeting the first cluster 624 to targeting the second cluster 626 for processing by the set of services deployed to the second cluster 626.

The number of clusters may be scaled up or down based upon current demand. For example, additional clusters can be created within the computing environment 618 for additionally processing incoming job request messages in a manner that provides load balancing amongst the clusters. If there is low demand, then one or more clusters may be deconstructed to release resources for other uses or to reduce costs otherwise incurred by consuming these resources.

In some embodiments, this architecture provides plugin support for cloud-native applications, such as an application executing within the computing environment 618 that is a cloud computing environment. For example, a plugin is designed to be deployed and operated within the computing environment 618. This architecture uses APIs of a provider of the computing environment (e.g., a cloud provider of the cloud computing environment) to deploy the first cluster 624, the second cluster 626 and/or other clusters with specified compute, storage, and networking components on which the plugin (a service of the set of services within the first cluster 624) is installed. For example, the service agent 620 may utilize the APIs to deploy the first cluster 624 and install the plugin in an automated manner without user intervention.

In some embodiments, this architecture deploys the plugin (a service) as a docker container on a Kubernetes cluster. The plugin is deployed without using components specific to a particular cloud service provider, and thus the plugin can be deployed in any cloud computing environment of any cloud provider or deployed on-premise. In some embodiments, open source components that can be utilized across various cloud computing environments and on-premise may be implemented, such as a MongoDB for persistence (e.g., persistent storage used by the first cluster 624 to store information, service data, task and job processing data, etc.), a RabbitMQ for a message bus (an exchange) used to pass messages such as job request message between services (e.g., messages between the job manager, the scheduler, the workflow engine, the database services 632, etc.), and/or a Netflix Conductor as the workflow engine. In some embodiments, this architecture utilizes the RabbitMQ message bus or other message bus whose queues (e.g., message queues of exchanges through which messages are passed between components and services of the first cluster 624) can be configured as durable. For example, these queues are persisted for durability such as within a persistent volume that is mounted to a RabbitMQ pod in a cluster such as a Kubernetes cluster (e.g., the first cluster 624). This provides fault tolerance against transient errors and resource recycling, which may be typical of cloud computing environments.

Figure 5:
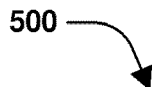
FIG. 5 is a flow chart illustrating an example of a set of operations that support microservices management and orchestration in accordance with an embodiment of the invention.

One embodiment of microservices management and orchestration is illustrated by an exemplary method 500 of FIG. 5 and further described in conjunction with system 600 of FIG. 6. This architecture provides a data management suite that corresponds to the user interface 604, the service agent 620, and the set of services that can be deployed within clusters of computing environments. The data management suite may be versioned such that various versions of the user interface 604, the service agent 620, and the set of services may be generated, stored within one or more repositories, and/or used to upgrade currently deployed instances of the user interface 604, the service agent 620, and the set of services.

In some embodiments, a versioned release of the data management suite may be generated. The versioned release of the data management suite may include the generation of a new service agent container image. The new service agent container image may comprise an image of a container corresponding to a new version of the service agent 620. The new service agent container image may be stored within a registry 616. The versioned release of the data management suite may include the generation of a new chart package. The new chart package may comprise information relating to a new version of the set of services and/or a new version of dependencies among the set of services. The new chart package may be stored within the chart repository 612. The versioned release of the data management suite may include the generation of a new set of container images. The new set of container images may comprise images of containers corresponding to new versions of the set of services. The new set of container images may be stored within the container repository 614. In this way, the new service agent container image, the new chart package, and/or the new set of container images may correspond to the versioned release of the data management suite, which may be used to update current instances of the service agent 620 and the set of services. In some embodiments, a same version identifier of the versioned release of the data management suite may be assigned to the new service agent container image, the new chart package, and/or the new set of container images. In this way, the new service agent container image, the new chart package, and/or the new set of container images have the same version identifier.

In some embodiments, a user interface upgrade package may be generated. The user interface upgrade package may comprise information that can be used by this architecture to upgrade the user interface 604. In some embodiments, the user interface upgrade package may be stored into a repository 610 (e.g., a bucket of a cloud provider) as a package. Because the user interface 604 resides within a SaaS portal, once the user interface 604 has been upgraded using the user interface upgrade package as an upgraded user interface, the upgraded user interface will be available to all clients of the architecture, in some embodiments. Because the user interface 604 is version aware and backwards compatible, the user interface 604 can be upgraded using the user interface upgrade package before any backend upgrades are performed such as upgrading of the service agent 620 using the new service agent container image, upgrading the set of services using the new chart package and/or the new set of container images, etc. In this way, the user interface 604 can handle instances where the backend components have not yet been upgraded or are rolled back to a prior version due to an error during a backend upgrade. If the upgraded user interface enables features that are not yet enabled by the service agent 620 and/or the set of services because the service agent 620 and/or the set of services are at a prior version, then those features are not displayed through the upgraded user interface until the backend components have been upgraded to enable such features.

In some embodiments, this architecture, such as a cloud manager component, may perform an upgrade of the current instance of the service agent 620. During operation 502 of method 500 of FIG. 5, the current instance of the service agent 620 is deployed within a container of the computing environment 618. The service agent 620 is deployed for creating clusters such as the first cluster 624 and the second cluster 626 within the computing environment 618, deploying sets of services as resources within the clusters of the computing environment 618, and/or managing the sets of services such as by routing communication between the client device 602 and the sets of services.

During operation 504 of method 500 of FIG. 5, a determination may be made as to whether a new service agent container image has been published into the registry 616 of service agent container images. If there is no new service agent container image, then the service agent 620 continues processing requests, during operation 510 of method 500 of FIG. 5. If there is a new service agent container image, then a container management component 622 may be updated to point to the new service agent container image, during operation 506 of method 500 of FIG. 5. In some embodiments, the container management component 622 comprises a docker compose in a service connector hosting the service agent 620 and/or other components such as a message poller that relays messages received by a cloud manager message broker through the user interface 604 to the service agent 620, a credential manager that authenticates messages from client devices, etc.

During operation 508 of method 500 of FIG. 5, the current instance of the service agent 620 is upgraded using the new service agent container image to create an upgraded service agent. For example, with the container management component 622, such as the docker compose, pointing to the new service agent container image, the upgraded service agent is deployed within a container of the computing environment 618. If there is a failure associated with the upgrading the current instance of the service agent 620 to the upgraded service agent using the new service agent container image, then a rollback procedure is performed. The rollback procedure may redeploy the current instance of the service agent 620 using a prior service agent container image.

Once the current instance of the service agent 620 has been upgraded using the new service agent container image to create an upgraded service agent, a determination may be made as to whether a service agent version of the upgraded service agent is the same or different than a cluster version of the first cluster 624 (e.g., a version identifier associated with the set of services deployed within the first cluster 624) and/or other clusters. If the service agent version of the upgraded service agent is different than the cluster version of the first cluster 624 such as where the upgraded service agent is a newer version compared to the first cluster 624, then the set of services within the first cluster 624 may be upgraded utilize a new chart package and/or a new set of container images having version identifiers correspond to the service agent version. As part of upgrading the set of services within the first cluster 624, the set of services and/or the scheduler may be set into a maintenance mode. While in the maintenance mode, currently pending jobs are completed while initialization of new jobs is blocked until the set of services of the first cluster 624 have been upgraded. The service agent 620 will wait until the pending jobs complete before upgrading the set of services within the first cluster 624.

In some embodiments of upgrading the first cluster 624, the set of services are microservices that are deployed as docker containers in a Kubernetes engine cluster (e.g., a GKE cluster). The microservices are installed and upgraded using chart packages, such as helm charts. The service agent 620 places the scheduler and the microservices into the maintenance mode (e.g., the scheduler and microservices may be transitioned from a normal operating mode to the maintenance mode). The service agent 620 will wait until the pending jobs complete before upgrading the set of services within the first cluster 624. Once the pending jobs are completed, the service agent 620 executes a helm upgrade command to upgrade a helm chart for the set of services to a new helm chart corresponding to the new version of the set of services. The new helm chart is also associated with the new set of container images of the services of the set of services. If any migration tasks are being performed, then the upgrade of the set of services will wait until the migration has completed.

In this way, the versioned release of the data management suit may be performed to upgrade the user interface 604, the service agent 620, and/or services deployed within clusters in the computing environment 618.

Figure 7:
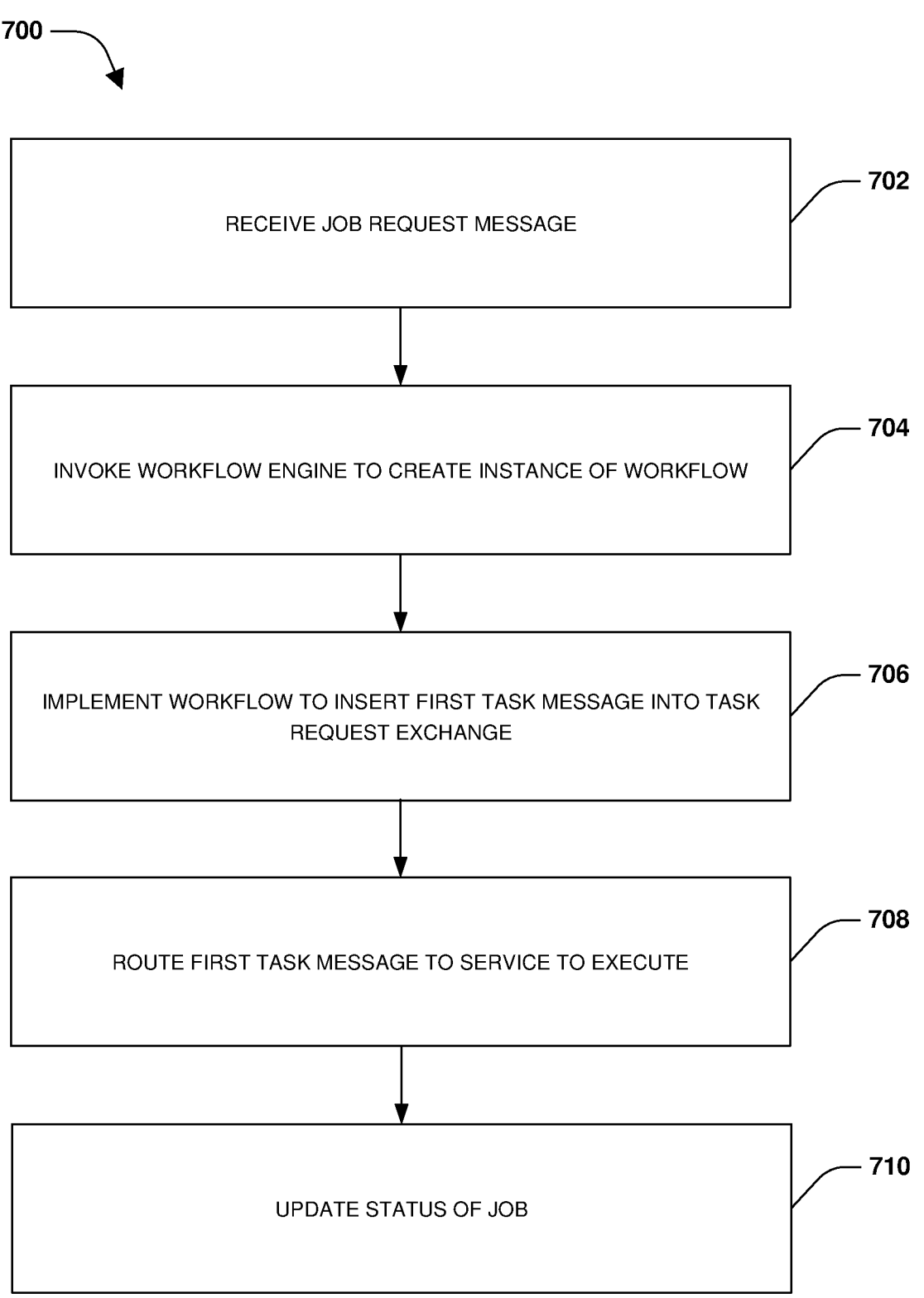
FIG. 7 is a flow chart illustrating an example of a set of operations that support microservices management and orchestration in accordance with an embodiment of the invention.

One embodiment of microservices management and orchestration is illustrated by an exemplary method 700 of FIG. 7, and further described in conjunction with system 800 of FIG. 8. The system 800 illustrates a set of services 842 deployed within a cluster of a computing environment, such as the set of services deployed within the first cluster 624 of the computing environment 618, as illustrated by FIG. 6. In some embodiments, the set of services 842 comprises data protection services 808, such as a retention service 810, a database discovery service 812, a database backup service 814 associated with a database policy 813, a database restore service 816, a storage service 818, and/or other services. The data protection services 808 may provide data backup, data restore, database discovery, and/or other functionality for database volumes 820 and/or database applications, such as a database application 824 through which the data protection services 808 can interact with through a database plugin 822. The set of services 842 may comprise infrastructure services, such as a job manager 804, a workflow engine 806, a scheduler 802, and/or other infrastructure services.

Communication may be facilitated between the services utilizing various exchanges over which messages may be queued for transmission in a durable manner, such as where queued messages can be persisted to persistent storage. In some embodiments, a job exchange 826 is used to communicate job request messages from the scheduler 802 to the job manager 804. The job request messages may correspond to scheduled jobs that are to be performed based upon a schedule implemented by the scheduler 802. The job manager 804 may also receive job request messages from client devices to perform jobs, such as on-demand jobs. An exchange 829 is used to communicate requests from the job manager 804 to the workflow engine 806 for the workflow engine 806 to create instances of workflows of tasks for performing jobs, such as based upon predefined workflow templates maintained by the workflow engine 806. A job status exchange 828 is used by the workflow engine 806 to communicate job status information to the job manager 804.

A task request exchange 830 is used by the workflow engine 806 to make task messages available to services that are subscribed to listen to routing keys assigned to the task messages. The task messages may correspond to tasks of a workflow for a job that is being performed. A task response exchange 832 is used by the services to transmit messages, regarding task execution progress and results, to the workflow engine 806. A task status exchange 834 is used by the services to transmit messages, regarding the status of task execution, to the job manager 804 so that the job manager 804 can update job status information of pending jobs. A plugin request exchange 838 is used by the database backup service 814 to transmit messages to the database plugin 822 for delivery to the database application 824. A plugin response exchange 840 is used by the database plugin 822 to transmit messages to the database backup service 814, such as messages relating to the database application 824.

Various types of communication may be provided for message communication. In some embodiments, a first communication channel may be used to facilitate communication relating to asynchronous tasks. In an example, the first communication channel may be associated with a publish-subscribe messaging pattern where senders of messages (publishers) are not directly sending messages to specific recipients (subscribers), but instead categorize published messages into classes (topics), which will be received by subscribers that subscribe to such classes (topics). In some embodiments, a second communication channel may be used to facilitate communication relating to synchronous tasks. In an example, the second communication channel may relate to remote procedure call communication such as gRPC communication. In some embodiments, a third communication channel may be used to facilitate communication of incoming job request messages to the set of services using representational state transfer (REST) communication. The third communication channel may be used by a service agent to communicate the job request messages through a reserve proxy (an ingress controller) for delivery to the services using the REST communication.

The job manager 804 may implement synchronous tasks and asynchronous tasks. The job manager 804 may process synchronous tasks and asynchronous tasks differently. In some embodiments, synchronous tasks are not meant to for long running processes. When a task request message for a synchronous task is received by the job manager 804, the job manager 804 calls a job task API with a running state (e.g., the synchronous task is now running) and invokes a registered callback to process the task request message. Once a response is received, the synchronous task is marked as completed or failed based upon the response. In some embodiments, asynchronous tasks are meant for long running processes. When a job request message for an asynchronous task is received by the job manager 804, the job manager creates the asynchronous task by calling a job task API with a new state (e.g., a new asynchronous task is being initialized) and invokes a registered callback to process the job request message. The callback begins the message processing asynchronously (e.g., by sending a message to another message queue/exchange), and responds immediately. The job manager 804 updates the task status to the running state. After some time when processing completes, the service notifies the job manager 804, which in turn marks the task as completed or failed.

In some embodiments of processing jobs, the job manager 804, associated with the set of services 842 deployed within the cluster as resources, may receive a job request message for execution of a job (e.g., a backup job, a restore job, etc.), during operation 702 of method 700 of FIG. 7. In an example, the job manager 804 may receive the job request message based upon the job request message having a topic/category subscribed to by the job manager 804. In an example, the job request message is received from the scheduler 802 through the job exchange 826 in response to the scheduler 802 generating the job request message based upon a schedule associated with the job.

Because tasks of one or more pending jobs may be currently being processed by one or more services, the job manager 804 may be configured to manage job concurrency. For example, a job request message may be populated with one or more fields that may be used to determine whether a job can execute or should wait or be failed based upon other pending jobs. The fields may correspond to a job type tag (e.g., the job is a backup job type, a restore job type, etc.). The fields may correspond to an object type field (e.g., an object upon which the job is to be executed such as a particular type of database such as a HANA database). The fields may correspond to an object identifier field (e.g., an identifier of the particular database). The fields may correspond to a maximum jobs in queue field (e.g., for a particular object type and object identifier, how many jobs with the same job type tag can be queued to execute upon an object having the object type and identifier). The fields may correspond to a wait for tags field and a wait for job identifiers field specifying that the job is to wait until jobs with particular job type tags are complete (e.g., a backup job is to wait until restore jobs are complete). The fields may correspond to a queue timeout field where a queued job will cancel out if queued for longer than the queue timeout field. The fields may correspond to a retry count field and a max retry field where a queued job will cancel if a value of the retry count field, corresponding to the number of times the job has been requeued, reaches a value of the max retry field (e.g., if a job cannot run, then the job is queued, and once dequeued a check will be performed to see if the job can now be run, and if not then the job is requeued). In an example of the job manager 804 facilitating job concurrency, the job manager 804 may compare a job type the of the job request message against job types of initialized jobs to determine whether the job can be executed or should be queued and wait (e.g., the job is queued because another job has the same job type and targets the same object identifier).

During operation 704 of method 700 of FIG. 7, the job manager 804 invokes the workflow engine 806 to create an instance of a workflow comprising one or more tasks corresponding to the job associated with the job request message. The workflow engine 806 can create the instance of the workflow using a predefined workflow template for the task. During operation 706 of method 700 of FIG. 7, the workflow is implemented to insert a first task message, comprising a routing key, into the task request exchange 830. The first task message corresponds to a first task of the one or more tasks of the job. During operation 708 of method 700 of FIG. 7, the first task message is received by a service based upon the service corresponding to the routing key. The service may execute the first task of the first task message. Once the service executes the first task, the service may send a first message through the task status exchange 834 to the job manager 804 and a second message through the task response exchange 832 to the workflow engine 806 regarding the execution of the first task. During operation 710 of method 700 of FIG. 7, in response to the job manager 804 receiving the first message through the task status exchange 834 that the first task has been executed, the job manager 804 updates a status of the job to indicate that the first task of the job is complete. In response to the workflow engine 806 receiving the second message through the task response exchange 832 that the first task has been executed, the workflow may be implemented to insert a second message comprising the routing key (or a different routing key if a different service is to process a next task) into the task request exchange 830. The second message may correspond to a second task (a next task) of the one or more tasks of the job to execute. In this way, tasks of the job are executed by services in order to complete the processing of the job.

In some embodiments, a first logging component may be deployed on demand for collecting logs of job processing data. The logs are consolidated by a second logging component, and are provided to an elastic search for storage and/or subsequent retrieval for processing. In some embodiments, authorization is provided for a request (a job request message) that is received through the reverse proxy (ingress controller) by a token validator that will make a call to an authentication service to download a token and/or files used to validate the request.

In some embodiments, a user interface 850 may be provided. A client may utilize the user interface 850 to access the services of system 800. For example, the client may utilize the user interface 850 to create a backup, perform a restore, create a snapshot, view database statistics (e.g., amount of physical storage used, an amount of logical storage used, average latency, average file size, access patterns, etc.).

Figure 9:
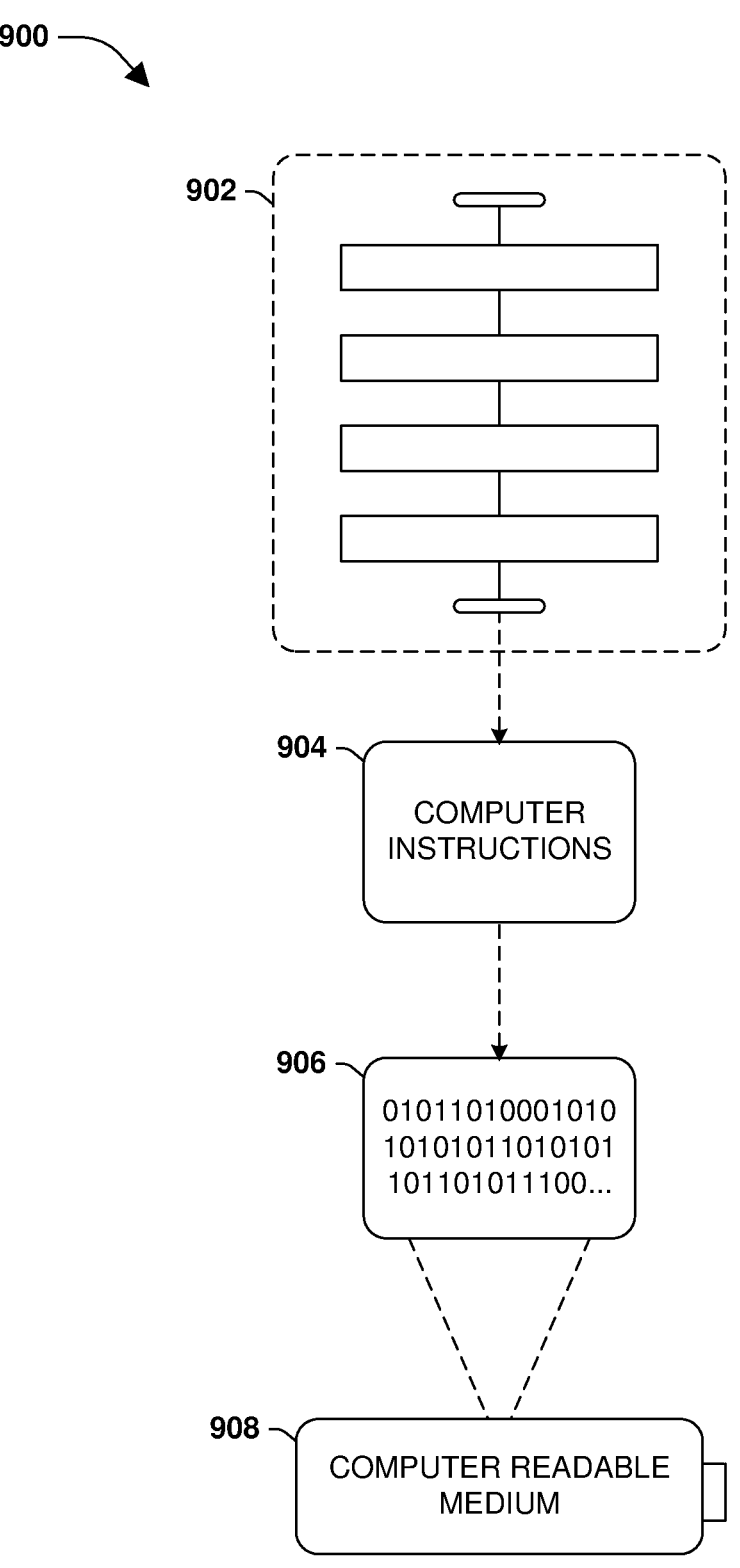
FIG. 9 is an example of a computer readable medium in which an embodiment of the invention may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 400 of FIG. 4, at least some of the exemplary method 500 of FIG. 5, and/or at least some of the exemplary method 700 of FIG. 7, for example. In some embodiments, the processor-executable computer instructions 904 are configured to implement a system, such as at least some of the exemplary system 600 of FIG. 6 and/or at least some of the exemplary system 800 of FIG. 8, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

retrieving container images from a container repository based upon the container images corresponding to a database service and a backup service to host within a cluster of a computing environment;

deploying the database service and the backup service as resources of the computing environment within the cluster using the container images;

connecting, by the database service, to a cloud provider agnostic database plugin for interacting with a database application host;

controlling the cloud provider agnostic database plugin to interact with the database application host for discovering and accessing a database volume stored within a storage environment separate from the computing environment executing an application storing data within the database volume;

creating, by the backup service, an application consistent snapshot of the database volume within the storage environment.

2. The method of claim 1, comprising:

executing a cluster initialization procedure to define a security policy used to authenticate job request messages for executing jobs through a set of services of the computing environment and a schedule used to control a scheduler for executing scheduled jobs;

in response to receiving a job request message for executing a job, authenticating the job request message using the security policy; and in response to successfully authenticating the job request message, scheduling and executing, by the scheduler, the job according to the schedule.

3. The method of claim 1, comprising:

detecting a failure associated with deploying at least one of the database service or the backup service; and in response to detecting the failure, performing a rollback procedure for the cluster to transition the cluster to a prior state before the failure.

4. The method of claim 1, comprising:

parsing a versioned release of a data management suite to identify an image of a container for a version of a service agent; and storing the image into a registry for access through an adapter service.

5. The method of claim 1, comprising:
executing a cluster initialization procedure to define a startup job to initialize a set of services and a data management policy associated with data backup and restore functionality implemented by a service of the set of services; and
executing the startup job to initialize the service to perform the data backup and restore functionality according to the data management policy.

6. The method of claim 1, comprising:
creating a secondary cluster within the computing environment;
deploying a first set of services as resources of the computing environment within the secondary cluster, wherein the first set of services are maintained as a redundant set of services for a second set of services deployed to the cluster; and
configuring dependencies for the first set of services and the second set of services using a chart package and the container images.

7. The method of claim 6, comprising:
in response to identifying a failure associated with the cluster, redirecting incoming job request messages from targeting the cluster to targeting the secondary cluster for execution.

8. A non-transitory machine readable medium comprising instructions, which when executed by a machine, causes the machine to:
implement, by a scheduler infrastructure service, a policy specifying when and how to perform jobs, wherein the scheduler infrastructure service generates a job request message based upon the policy specifying how to perform a job to maintain redundant instances of a service for failover;
generate, by a workflow engine scheduler infrastructure service, a job definition of tasks to execute through a workflow for performing the job according to the policy; and
execute the workflow according to the policy by:
retrieving a container image from a container repository based upon the container image corresponding to the service;
creating a cluster and a redundant cluster within a computing environment based upon the policy;
deploying the service within the cluster and a redundant instance of the service within the redundant cluster as resources of the computing environment; and
in response to detecting a failure of the cluster, implementing, by the scheduler, the policy to redirect job request messages from targeting the cluster to targeting the redundant cluster for execution by the redundant instance of the service.

9. The non-transitory machine readable medium of claim 8, wherein the instructions cause the machine to:
execute a cluster initialization procedure to define a security policy used to authenticate the job request messages for executing jobs through a set of services and a schedule used to control the scheduler infrastructure service for executing scheduled jobs;
in response to receiving an incoming job request message for executing a defined job, authenticate the incoming job request message using the security policy; and
in response to successfully authenticating the incoming job request message, schedule and execute, by the scheduler, the defined job according to the schedule.

10. The non-transitory machine readable medium of claim 8, wherein the instructions cause the machine to:
detect a failure associated with configuring dependencies of the service with other services; and
in response to detecting the failure, perform a rollback procedure for the cluster to transition the cluster to a prior state before the failure.

11. The non-transitory machine readable medium of claim 8, wherein the instructions cause the machine to:
parse a versioned release of a data management suite to identify an image of a container for a new version of a service agent; and
store the image into a registry for access through an adapter service.

12. The non-transitory machine readable medium of claim 8, wherein the instructions cause the machine to:
execute a cluster initialization procedure to define a startup job to initialize a set of services and a data management policy associated with data backup and restore functionality implemented by the service; and
execute the startup job to initialize the service to perform the data backup and restore functionality according to the data management policy.

13. The non-transitory machine readable medium of claim 8, wherein the instructions cause the machine to:
create a secondary cluster within the computing environment;
deploy a first set of services as resources of the computing environment within the secondary cluster, wherein the first set of services are maintained as a redundant set of services for a second set of services deployed to the cluster; and
configure dependencies using a chart package and a set of container images.

14. The non-transitory machine readable medium of claim 13, wherein the instructions cause the machine to:
in response to identifying a failure associated with the cluster, redirect incoming job request messages from targeting the cluster to targeting the secondary cluster for execution.

15. A computing device comprising:
a memory comprising machine executable code; and
a processor coupled to the memory, the processor configured to execute the machine executable code to cause the computing device to implement:
a message broker:
bypassing communication restrictions implemented by a computing environment to restrict communication between a client device and a service agent, wherein the message broker receives a message from the client device for deploying a cluster; and
routing the message to the service agent hosted as a container within the computing environment; and
the service agent executing the message by:
retrieving a chart package selected from a chart repository of chart packages based on a set of services to host within the cluster and dependencies amongst the set of services;
retrieving a set of container images from a container repository based upon the set of container images corresponding to the set of services;
creating the cluster within the computing environment; and
deploying the set of services as resources of the computing environment within the cluster and configuring the dependencies using the chart package and the set of container images.

16. The computing device of claim 15, wherein the machine executable code causes the computing device to:

execute a cluster initialization procedure to define a security policy used to authenticate job request messages for executing jobs through the set of services and a schedule used to control a scheduler for executing scheduled jobs;

in response to receiving a job request message for executing a job, authenticate the job request message using the security policy; and in response to successfully authenticating the job request message, schedule and execute, by the scheduler, the job according to the schedule.

17. The computing device of claim 15, wherein the machine executable code causes the computing device to:

detect a failure associated with deploying the set of services and configuring the dependencies; and in response to detecting the failure, perform a rollback procedure for the cluster to transition the cluster to a prior state before the failure.

18. The computing device of claim 15, wherein the machine executable code causes the computing device to:

parse a versioned release of a data management suite to identify an image of a container for a new version of the service agent; and store the image into a registry for access through an adapter service.

19. The computing device of claim 15, wherein the machine executable code causes the computing device to:

execute a cluster initialization procedure to define a startup job to initialize the set of services and a data management policy associated with data backup and restore functionality implemented by a service of the set of services; and execute the startup job to initialize the service to perform the data backup and restore functionality according to the data management policy.

20. The computing device of claim 15, wherein the machine executable code causes the computing device to:

create a secondary cluster within the computing environment;

deploy the set of services as resources of the computing environment within the secondary cluster;

configure the dependencies using the chart package and the set of container images; and in response to the cluster experiencing a failure, redirect incoming job request messages from targeting the cluster to targeting the secondary cluster for processing by the set of services deployed within the secondary cluster.

* * * * *